Patented Sept. 1, 1936

2,052,663

UNITED STATES PATENT OFFICE 2,052,663

AMMONIUM SALTS OF ACETYL SALICYLIC ACID

Pincus Rothberg, New York, N. Y., and Leo A. Flexser, Union City, N. J., assignors to Montrose Chemical Co., Inc., Newark, N. J., a corporation of New York No Drawing. Application January 7, 1936, Serial No. 57,920

7 Claims. (Cl. 260—107)

This invention relates to ammonium salts of acetyl salicylic acid.

The analgesic, antipyretic and antirheumatic therapeutic value of acetyl salicylic acid, more popularly known as aspirin, has resulted in its wide use for these purposes. However, such use has been recognized by medical authorities as attended by certain disadvantages and even harmful effects. On account of its relatively strong acidity (being stronger, for example, than acetic or benzoic acid) medical literature has reported that when acetyl salicylic acid is introduced into the stomach irritation has resulted leading even to formation of ulcers.

Being insoluble in water, acetyl salicylic acid cannot be administered so as to wholly avoid concentration of the acid at particular portions of the stomach walls, and has thus given rise to local irritation. Its water insoluble character and strong acid taste has, moreover, been a drawback to the recommended use of acetyl salicylic acid as a gargle because of the grittiness and sour taste of the liquid.

The ammonium salts of acetyl salicylic acid, so far as we are aware, have not been prepared. The full salt prepared in accordance with our invention, we have found to be of a high degree of stability so as to answer practical requirements of handling and storage and very readily soluble in water. It, moreover, possesses the therapeutic qualities of aspirin and being of much lower acidity (approximately 1/5000 of the acidity of aspirin from the calculated pH values) is free from the disadvantages and harmful effects such as above enumerated.

In accordance with our invention the full or half ammonium salt of acetyl salicylic acid may be prepared by dissolving or suspending acetyl salicylic acid in a neutral anhydrous solvent or mixture of several solvents and then passing anhydrous ammonia gas into the solution or suspension. The acetyl salicylic acid is converted quantitatively under these conditions into either the full or half ammonium salt of acetyl salicylic acid. Where the reaction is permitted to continue so that the ammonia gas is consumed in a proportion of 17 grams thereof to 180 grams of acetyl salicylic acid, the full salt is obtained. If only 8½ grams of the ammonia gas is permitted to combine with 180 grams of the acetyl salicylic acid, the half salt is produced.

The salt may be filtered off, washed free of adherent solvent, and then dried either under vacuum or atmospheric pressure. The full salt so obtained shows no free salicylic acid, dissolves readily in water, and is highly stable. Analysis shows the composition thereof to be $C_9H_{11}NO_4$. On adding fixed alkali to the water solution thereof, ammonia is given off in the quantity corresponding to the above formula. On the other hand, on acidifying the solution of this full salt, a precipitate is obtained, which on filtration and drying proves to be acetyl salicylic acid, thus proving that the product is a true ammonium salt of acetyl salicylic acid, whose structural formula we believe may be expressed as

Likewise, analysis of the half salt obtained as above described shows that it has no free salicylic acid, has a solubility in water and acidity intermediate that of aspirin and of the full ammonium salt; on addition of fixed alkali gives off ammonia in the quantity corresponding to the formula $C_{18}H_{19}NO_8$; and on acidifying a precipitate is produced which on filtration and drying proves to be acetyl salicylic acid. The structural formula of this half salt we believe may, therefore, be expressed as

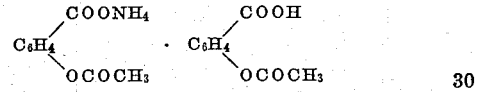

The solvents or suspension media to be employed are available in large number; to mention a few but without limiting ourselves, ethers, alcohols, ethylene dichloride, ethylene trichloride, chloroform, carbon tetra-chloride, propylene dichloride, ethyl acetate, amyl acetate, butyl acetate, benzol, and the like solvents, or mixtures of two or more thereof may be employed provided, however, care is taken that the solvent or medium is water free.

For the full salt the following is an example of the carrying out of our process which has produced good results: 180 grams of acetyl salicylic acid are suspended in one liter of anhydrous ether. Into this suspension anhydrous ammonia gas is passed under constant stirring until 17 grams of ammonia have been consumed. The heavy precipitate formed is filtered on a Buchner funnel or separated from the mother liquor by any other suitable means. The filtrate is then washed with 200 cc. of ether and then dried. The mother liquor may be used for successive batches. A yield of about 190 grams of the ammonium acetyl salicylate is obtained.

For the preparation of the half salt the procedure is exactly the same as given for the full salt except that the reaction is stopped when 8½ grams of ammonia have been consumed. The half salt being, as above stated, intermediate in water solubility and acidity to the full salt and the original acetyl salicylic acid, may likewise for some purposes serve better than aspirin.

It will thus be clear that we have produced highly stable water-soluble salts of acetyl salicylic acid which may be employed in place of aspirin for the same and perhaps other and better therapeutic effects without the disadvantages attending the use of aspirin itself.

It will thus be seen that there is provided a composition and process in which the several objects of this invention are achieved, and which are well adapted to meet the conditions of practical use.

As various embodiments might be made of the above invention, and as various changes might be made in the embodiment above set forth, it is to be understood that all matter herein set forth is to be interpreted as illustrative and not in a limiting sense.

Having thus described our invention, we claim as new and desire to secure by Letters Patent:

1. As a new composition of matter, an ammonium salt of acetyl salicylic acid.

2. As a new composition of matter, stable half ammonium salt of acetyl salicylic acid.

3. As a new composition of matter, a water soluble full ammonium salt of acetyl salicylic acid.

4. A process for preparing ammonium acetyl salicylate comprising combining ammonia gas with acetyl salicylic acid suspended in an inert anhydrous medium.

5. A process for preparing ammonium acetyl salicylate consisting in preparing a suspension or solution of acetyl salicylic acid in an inert anhydrous medium and passing into such suspension or solution ammonia gas for quantitative reaction with said acetyl salicylic acid.

6. A process for preparing the half ammonium salt of acetyl salicylic acid comprising combining ammonia gas for half quantitative reaction with acetyl salicylic acid suspended in an inert anhydrous medium.

7. A process for preparing the half ammonium salt of acetyl salicylic acid consisting in preparing a suspension or solution of acetyl salicylic acid in an inert anhydrous medium and passing into such suspension or solution ammonia gas for half quantitative reaction with said acetyl salicylic acid.

PINCUS ROTHBERG.
LEO A. FLEXSER.